United States Patent [19]

Kolpak

[11] Patent Number: 5,535,632
[45] Date of Patent: Jul. 16, 1996

[54] SYSTEMS AND METHODS FOR MEASURING FLOW RATES AND DENSITIES OF THE COMPONENTS OF OIL, WATER AND GAS MIXTURES

[75] Inventor: Miroslav M. Kolpak, Dallas, Tex.

[73] Assignee: Atlantic Richfield Company, Los Angeles, Calif.

[21] Appl. No.: 328,952

[22] Filed: Oct. 24, 1994

Related U.S. Application Data

[63] Continuation-in-part of Ser. No. 131,813, Oct. 5, 1993, abandoned.

[51] Int. Cl.$^6$ ................................................ G01F 15/08
[52] U.S. Cl. ........................................ 73/861.04; 73/200
[58] Field of Search .............................. 73/861.04, 200

[56] References Cited

U.S. PATENT DOCUMENTS

| | | | |
|---|---|---|---|
| 4,688,418 | 8/1987 | Cheung et atl. | 73/200 |
| 4,760,742 | 8/1988 | Hatton | 73/861.04 |
| 4,773,257 | 9/1988 | Aslesen et al. | 73/861.04 |
| 4,776,210 | 10/1988 | Baillie et al. | 73/861.04 |
| 4,852,395 | 8/1989 | Kolpak | 73/61.1 R |
| 4,881,412 | 11/1989 | Northedge | 73/861.04 |
| 5,090,253 | 2/1992 | Kolpak | 73/861.38 |
| 5,127,272 | 7/1992 | Dean et al. | 73/861.04 |
| 5,211,842 | 5/1993 | Tuss et al. | 73/861.04 |
| 5,224,372 | 7/1993 | Kolpak | 73/19.03 |

Primary Examiner—Richard Chilcot
Assistant Examiner—Harshad Patel
Attorney, Agent, or Firm—Michael E. Martin

[57] ABSTRACT

Multiphase fluid flowstreams of gas, oil and water are measured by flowmeters which include an embodiment using a turbine flowmeter and a densitometer with total accuracy in the range of ±15%, and an embodiment using a gas-liquid separator and a Coriolis flowmeter for flowstreams of a relatively high gas-to-liquid ratio with accuracies of ±5% when the gas carry-over in the liquid flowstream is less than about 5%. A second alternate embodiment includes a water fraction meter, a turbine flowmeter and a densitometer for measuring flows with relatively low gas-to-liquid ratios but accurate measure of the water fraction. A meter capable of handling relatively high gas-to-liquid ratio but with residual gas in the liquid flowstream of less than 5% includes a separator, a Coriolis meter for measuring the liquid density and mass flow rate in the liquid flowstream and a densitometer and turbine flowmeter for measuring the fluid in the gas flowstream leaving the separator. A fourth alternate embodiment includes a turbine flowmeter and a densitometer in both flowstreams leaving the separator and a water fraction meter in the liquid flowstream wherein mixtures with high gas-to-liquid ratio and residual gas in the liquid flowstream of up to about 20% may be measured.

22 Claims, 4 Drawing Sheets

SYSTEMS AND METHODS FOR MEASURING FLOW RATES AND DENSITIES OF THE COMPONENTS OF OIL, WATER AND GAS MIXTURES

This is a continuation-in-part of application Ser. No. 08/131,813 filed on Oct. 5, 1993 now abandoned.

BACKGROUND OF THE INVENTION

1. Field of the Invention

The present invention pertains to several embodiments of a modular, multiphase fluid flowmeter system and related methods for measuring multiphase fluid flow, particularly mixtures of gas, oil and water.

2. Background

My U.S. Pat. Nos. 4,852,395, issued Aug. 1, 1989, and 5,224,372, issued Jul. 6, 1993, pertain to multiphase fluid flowmeters for measuring mixtures of gas, oil and water with a high degree of accuracy. In certain flowmeter applications, such as in low-volume oil production wells and other flow measuring requirements, the degree of accuracy required is not as great as that provided for by the meters described in the patents. On the other hand, there are applications for fluid flowmeters which may have a predetermined measurement accuracy requirement which changes during the life of the system to which the flowmeter is connected. Accordingly, it would be desirable in such applications to have a modular flowmeter system to which additional components could be added or deleted as the measurement accuracy requirements change or as the composition of the multiphase fluid flow being measured changes. An example of the latter requirement would be measuring flow from oil production wells wherein the water fraction or "water cut" in the liquid flowstream changes as the oil reservoir is depleted, or the amount of gas being produced with the liquid also changes as the characteristics of the oil reservoir change.

In all events, it has been deemed desirable to provide improvements in multiphase fluid flowmeters and the associated methods for measuring flow which are operable to provide continual monitoring of production of mixtures of oil, water and gas from a well wherein the metering accuracy is in a range of ±15% of true fluid volumes, or somewhat better than these accuracies, and wherein the cost of the metering equipment is of some importance, such as wherein the flowmeters are required to be connected to each well in a large and dispersed oilfield, for example. It is to these ends that the present invention has been developed.

SUMMARY OF THE INVENTION

The present invention provides a family of fluid flowmeters which have multiphase fluid flow measuring capability, may be modified to include certain features, depending on the characteristics of the multiphase fluid flowstreams, are economical to provide and operate and have an accuracy sufficient to meet existing and changing requirements in applications such as measuring the flow from oil production wells of fluid mixtures of gas, oil and water.

In accordance with one important aspect of the present invention, a multiphase fluid flowmeter system is provided which is characterized by a commercially available meter which is capable of measuring a gassy liquid flow, a densitometer for measuring the mixture density and pressure and temperature gauges for determining the gas density. With these "minimum" components, a meter volumetric flow rate accuracy of ±15% will be satisfied where the gas volume is only about 25% of the total fluid volume at a predetermined pressure. The system will provide continuous and approximate rates of gas, water and oil flow with known properties of oil, water and gas density, gas compressibility factor, approximate water fraction in the liquid mixture, and the fluid mixture pressure and temperature.

In accordance with another aspect and embodiment of the present invention, a fluid flowmeter is provided which includes a gas-liquid separator and a Coriolis meter operable to measure the flow rates of gas, water and oil and which provides a meter having a tolerance for relatively high ratios or volumes of gas in relation to the total liquid flow while achieving volumetric flow rate measurement accuracy in the range of about ±5% or better.

A third embodiment of the invention, similar to the first embodiment, is suitable for measuring flows wherein the gas flow rates are relatively low and wherein an accurate measurement of the water fraction in the liquid mixture may be achieved with an economical system.

Still further in accordance with the present invention, a multiphase fluid flowmeter is provided which is capable of handling a relatively high volume of gas in the total fluid flowstream, wherein the foaminess of the liquid mixture is relatively low and wherein an economical gas-liquid separator is provided including means for controlling the liquid level in the separator.

Still further, the present invention provides a multiphase fluid flowmeter capable of measuring fluid flow rates wherein the foaminess of the liquid is relatively high, and wherein the water fraction in the liquid mixture may be accurately measured.

The various embodiments of the invention provide for continuous measurement of oil, water and gas flow rates with varying degrees of accuracy with the capability of adding or subtracting system components depending on the required flow rate accuracy, the fraction of the total flow of each of oil, water and gas, the foaminess of the liquid, (primarily the oil) and whether or not the water fraction needs to be accurately measured. The systems are relatively inexpensive, may be provided by components that are commercially available and provide unique combinations of equipment and an improved method of measurement for each system, as will be appreciated by those skilled in the art from the detailed description which follows.

DESCRIPTION OF THE PREFERRED EMBODIMENTS

Figure 2:
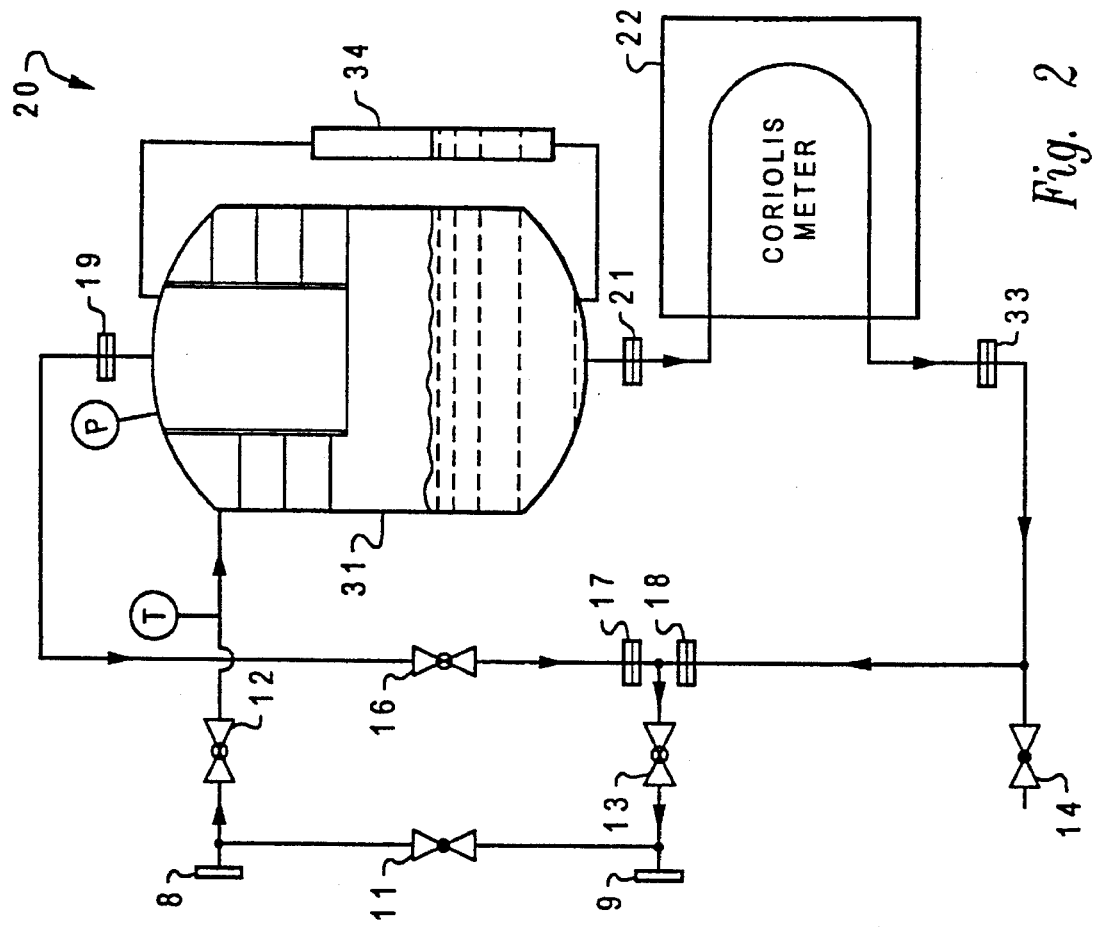
FIG. 2 is a schematic diagram of a first alternate embodiment of a multiphase fluid flowmeter for measuring the rates of gas, water and oil flow for relatively gassy mixtures.

In the description which follows, like parts and mathematical quantities are marked throughout the specification and the drawing figures with the same reference numerals and symbols, respectively. The components of the systems shown in the drawing figures are illustrated in schematic form in the interest of clarity and conciseness.

Figure 1:
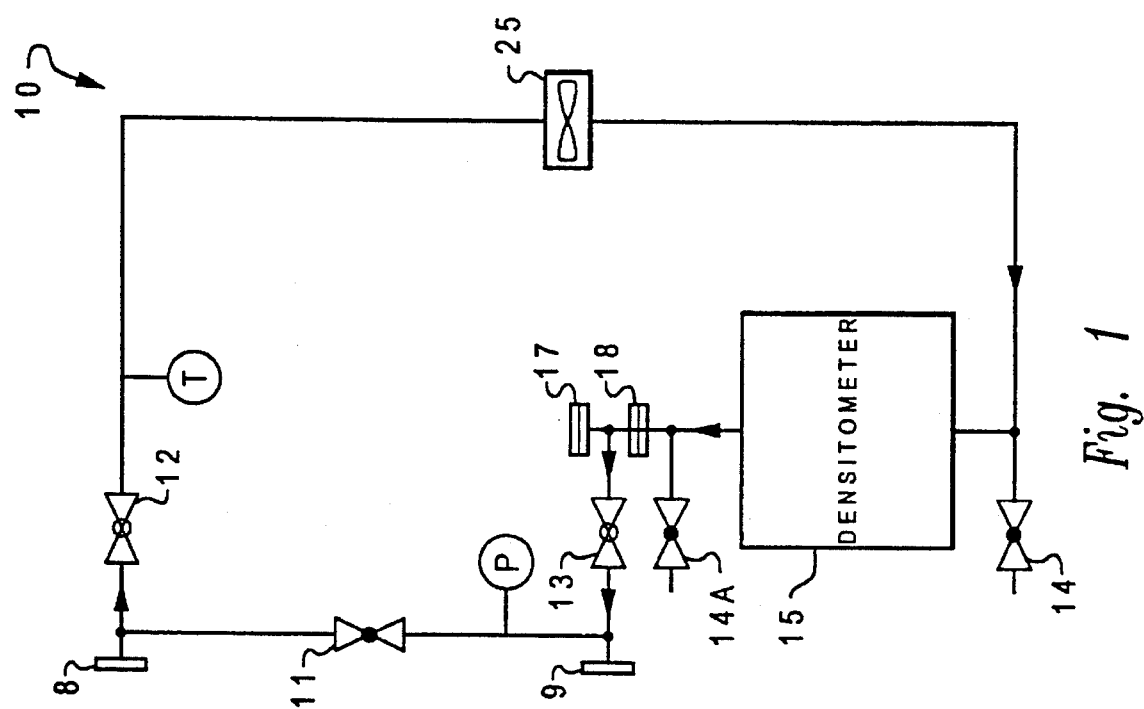
FIG. 1 is a schematic diagram of a multiphase fluid flowmeter wherein the approximate rates of gas, water and oil may be measured with particular known physical properties of the mixture components.

Referring to FIG. 1, there is illustrated a multiphase fluid flowmeter 10 which, for example, is adapted to be connected to a fluid production flowline, not shown, leading from a wellhead to a production fluid gathering and treatment system. The flowmeter 10 includes conventional pipe flanges 8 and 9 which are operable to connect the flowmeter 10 to the flowline. A suitable bypass valve 11 interconnects the conduits leading from and to the flanges 8 and 9, respectively, as illustrated. So-called isolation valves 12 and 13 are also provided for isolating the flowmeter 10 when maintenance or replacement of meter components is required or when the operation of the meter is not required. Under these conditions, the valves 12 and 13 are closed and the bypass valve 11 is open to allow production fluid flow to proceed from the wellhead through the aforementioned production flowline. Flow diverted from the wellhead to the meter 10 flows through the valve 12 to a conventional turbine flowmeter 25 which may be of a type commercially available from Halliburton Company, Duncan, Okla. The flowmeter 25 is connected to a densitometer 15 which also may be of a type commercially available such as a so-called gamma ray densitometer available from Texas Nuclear Company of Round Rock, Tex. as their Model S-series. The fluid flowing out of the densitometer 15 flows through the isolation valve 13 and the conduit connected to the flange 9 for discharge to the aforementioned production flowline. Flange connectors 17 and 18 may be included in the meter 10 for expansion of the meter to include other components as will be described in further detail herein. A liquid drain valve 14 is operable to drain liquid from the meter 10 when it has been isolated from receiving fluid flow and a second liquid drain valve 14A is provided for use in calibrating the densitometer 15, for example.

Use and operation of the flowmeter 10 is particularly suitable when a relatively low degree of volumetric flow measurement accuracy is required and the in situ gas volume is no more than about twenty five percent of the total fluid volume. The flowmeter system 10 also includes suitable pressure and temperature sensors, as indicated in FIG. 1, for measuring pressure and temperature of the fluid mixture flowing through the meter 10. The readings of pressure, temperature and stream density measured from the densitometer 15 may be compared with assumed densities of oil and water, gas specific gravity (air=1.0), the gas compressibility factor and the so-called watercut. For gases such as natural gas at temperatures and pressures greater than 25° F. and 500 psig, the compressibility factor should be considered in determining gas density. Values of the temperatures and pressure of the fluid stream may alternatively be assumed. However, the measurements generated by the flowmeter 25, the densitometer 15, and the pressure and temperature sensors may be read by a suitable data acquisition system, not shown, which is capable of performing the below described calculations to determine gas density, liquid density (a mixture of oil and water) and the respective volumetric flow rates of oil, water liquid and gas. The equations for determining these parameters are given below.

gas density $$dg = \text{gas density} \qquad (1)$$
$$= (29 \cdot Gg \cdot P)/(10.73 \cdot z \cdot (460 + T))$$

$$dl = \text{liquid (oil + water) density} \qquad (2)$$
$$= do(1 - WC) + dw(WC)$$

$$Ql = \text{liquid} \qquad (3)$$
$$= \text{flow rate}$$
$$= Qm(dm - dg)/(dl - dg)$$

$$Qo = \text{oil flow rate} \qquad (3a)$$
$$= (1 - WC)Q_L$$

$$Qw = \text{water flow rate} \qquad (4)$$
$$= WC \cdot Q_L$$

$$Qg = \text{gas flow rate, cubic feet/day} \qquad (5)$$
$$= (Qm - Qo - Qw)(5.615)$$

where do=oil density, dw=water density, and dg, dl, do, dm and dw are in pounds per cubic foot. Ql, Qo, Qw and Qm are in BPD. Gg=the gas specific gravity (air=1.0), z is the gas compressibility factor, WC is the so-called watercut, that is the ratio of the volumetric flow rate of water to the total liquid flow rate, P is the fluid pressure in psia, T is the fluid mixture temperature in degrees F and BPD is the liquid flow rate in barrels (42 U.S. gallons) per day. Qm is the stream volumetric flow rate measured by the flowmeter 25 and dm is the stream density measured by the densitometer 15. Accordingly, if the densities of oil, water and gas are previously measured or assumed, the gas compressibility factor is previously measured or assumed and the water fraction is previously measured or assumed, the volumetric flow rates of oil, water and gas may be determined using only the flowmeter 25 and the densitometer 15 together with either measured values of pressure and temperature or assumed values of pressure and temperature of the fluid flowstream.

Referring now to FIG. 2, there is illustrated a flowmeter 20 which is capable of handling a greater fraction of gas in the total fluid flow. The system 20 has interposed therein a separator vessel 31 which may be of the type described in further detail in U.S. Pat. No. 4,852,395 wherein a high efficiency separation of liquid and gas is accomplished with liquid and gas residence times within the separator of only several seconds. For example, a 3000 barrel per day oil production well might require a separator only about twenty inches in diameter and about twenty-four inches in height. Gas exits from the top of the separator 31 through a conduit connected to a flange 19 and liquid exits from the bottom of the separator through a conduit connected to flange 21.

Automatic liquid level or pressure control via a motor operated valve may be provided for the separator 31. However, if the isolation or outlet valve 13 is placed below the elevation of the separator 31 and if the pressure drop in the gas flowpath is approximately equal to that in the liquid flowpath leaving the separator, the liquid level may be controlled by adjusting a flow control valve 16 which is interposed in the gas discharge conduit and which recombines with the liquid flow from the liquid discharge conduit at the interconnected flanges 17 and 18 so that a commingled gas and liquid flowstream leaves the flowmeter 20 by way of the valve 13 and the production flowline, not shown, connected to flange 9.

For example, the position of a hand-operated valve 16 may be adjusted as the well begins to flow a fluid mixture to be measured by the system 20 while observing the liquid level from a sight glass 34 so as to set the desired liquid level. Occasional adjustment of the valve 16 may be required to compensate for changing flow conditions. Moreover, the liquid level in the separator 31 may fluctuate if the well produces liquid slugs but the level should rarely drop below the flange 21 or rise above the flange 19.

The flowmeter 20 includes a Coriolis flowmeter 22 interposed in the liquid conduit between the flange 21 and a flange 33, and of a type which may be commercially available such as from Micro Motion, Inc. of Boulder, Colo. as their Model D-series. Alternatively, a Coriolis type meter may be used such as described in my U.S. Pat. No. 5,090,253, issued Feb. 25, 1992 and assigned to the assignee of the present invention. The flowmeter 20 will provide for measuring continuous volumetric flow rates of gas, liquid, water and oil if the values of density of oil, water and gas are known or assumed, the gas compressibility factor is known or assumed, the water fraction is known or assumed and, alternatively, fluid stream pressure and temperature may either be measured or assumed.

The flowmeter 20 is operable to determine volumetric flow rates of oil, water and gas with an error of less than about ±5%. The Coriolis meter 22 is capable of measuring the gassy liquid mixture flowstream density in pounds per barrel and the gassy liquid mixture mass flow rate in pounds per day, for example. The following calculations are made based on the measured values of liquid stream density, dc, and the liquid stream mass flow rate, Mc. A suitable data acquisition and calculation system may be connected to the Coriolis meter 22 and the pressure and temperature sensors of the flowmeter 20 to perform the following calculations.

$$dg = \text{gas density} \quad (6)$$
$$= (29 \cdot Gg \cdot P)/(10.73 \cdot z \cdot (460 + T))$$

$$dl = \text{liquid (oil + water) density} \quad (7)$$
$$= do(1 - WC) + dw(WC)$$

$$Qc = \text{gassy liquid flow rate; from Coriolis meter; BPD} \quad (8)$$
$$= Mc/dc$$

$$Q_L = \text{liquid flow rate; BPD} \quad (9)$$
$$= Qc(dc - dg)/(dl - dg)$$

$$Qo = \text{oil flow rate; BPD} \quad (9a)$$
$$= (1 - WC)Q_L$$

$$Qw = \text{water flow rate; BPD} \quad (10)$$
$$= WC \cdot Q_L$$

$$Qg = \text{gas flow rate; cubic feet/day} \quad (11)$$
$$= (Qm - Qo - Qw)(5.615)$$

Figure 3:
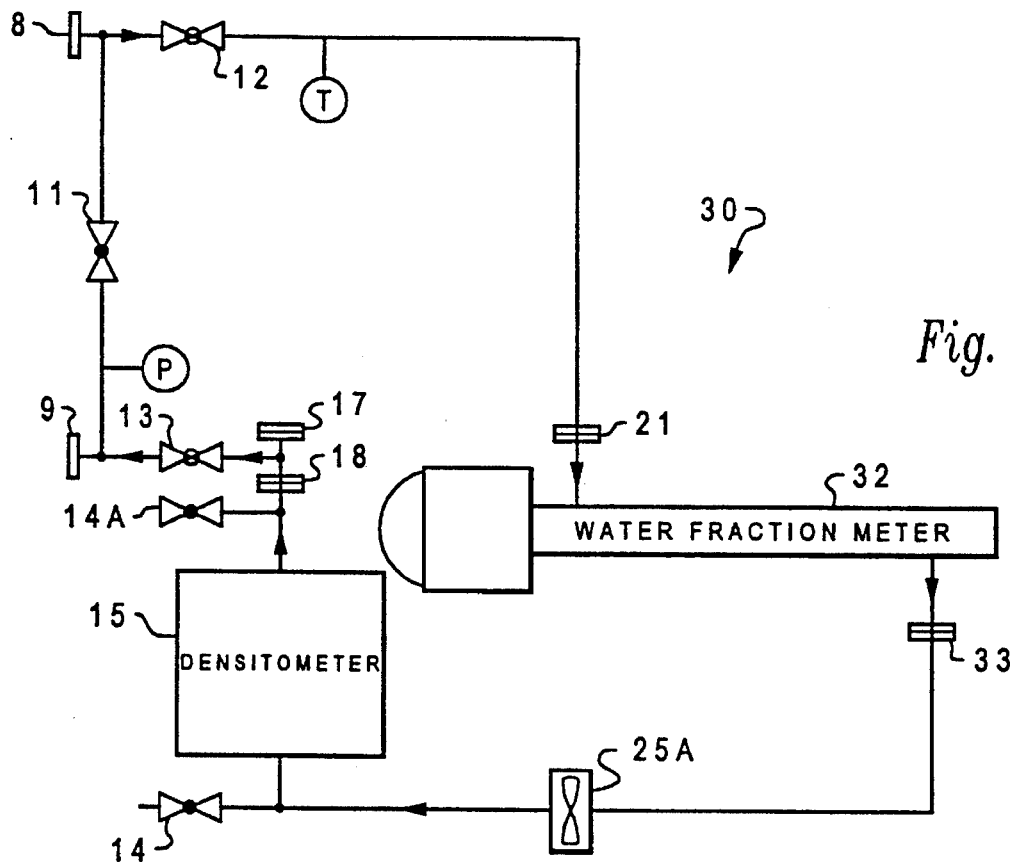
FIG. 3 is a schematic diagram of a multiphase fluid flowmeter similar to the embodiment of FIG. 1 but including a water fraction meter.
Figure 6:
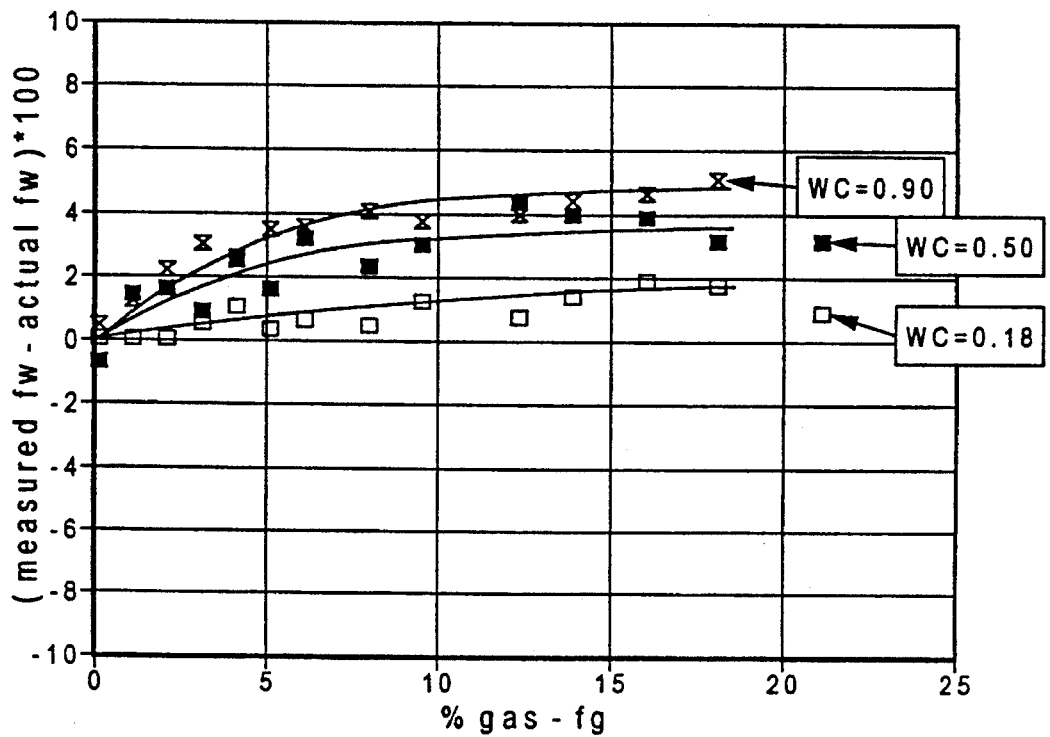
FIG. 6 is a diagram of correction factors for the water fraction of a multiphase fluid mixture as a function of the gas fraction.

Referring now to FIG. 3, there is illustrated a flowmeter 30 similar in some respects to the flowmeter 10 but including a water fraction meter 32 interposed between a turbine flowmeter 25A, similar to the flowmeter 25, and the isolation or inlet valve 12. The water fraction meter 32 may be of the type described in U.S. Pat. Nos. 4,862,060, issued Aug. 29, 1989, or 4,996,490, issued Feb. 26, 1991 to Scott, et al, and both assigned to the assignee of the present invention. Commercial embodiments of these meters are available from Phase Dynamics, Inc., Richardson, Tex. The flowmeter 30 is basically suitable for measuring multiphase fluid flow having a relatively low gas-to-liquid ratio and is capable of measuring oil and water flow rates wherein a highly accurate measurement of the water fraction is desired. The "water fraction" is defined as the ratio of the volumetric flow rate of water to the volumetric flow rate of the total fluid mixture, that is, water, oil and gas. Predetermined values of the density of oil, water and gas are obtained or assumed as well as the gas compressibility factor. Pressure and temperature values may be assumed or measured using the sensors illustrated in FIG. 3. Total fluid flowstream density, dm, is measured with the densitometer 15, total fluid flowstream flow rate, Qm, in barrels per day is measured from the flowmeter 25A, and the apparent water fraction, fw, is measured by the water fraction meter 32. The flow rates of oil, water and gas may be obtained from the following set of equations using a suitable data acquisition and calculation system as aforementioned and using the measurements referenced hereinabove.

$$dg = \text{gas density} \quad (12)$$
$$= (29 \cdot Gg \cdot P)/(10.73 \cdot z \cdot (460 + T))$$

$$fg = \text{stream gas fraction; first approximation} \quad (13)$$
$$= [do(1 - fw) + dw(fw) - dm]/(do - dg)$$

$$WC = \text{water cut; first approximation} \quad (14)$$
$$= fw/(1 - fg)$$

$$fw^* = \text{corrected water fraction} \quad (15)$$
$$= \text{function of } fw \text{ and } WC: \text{see FIG. 6}$$

$$fg^* = \text{stream corrected gas fraction} \quad (16)$$
$$= [do(1 - fw^*) + dw(fw^*) - dm]/do - dg)$$

$$Qo = \text{oil flow rate; BPD} \quad (17)$$
$$= Qm(1 - fg^* - fw^*)$$

$$Qw = \text{water flow rate; BPD} \quad (18)$$
$$= Qm(fw^*)$$

$$Qg = \text{gas flow rate; cubic feet/day} \quad (19)$$
$$= Qm(fg^*)(5.615)$$

FIG. 6 is a diagram illustrating the effect of gas bubbles in the liquid flowstream on the accuracy of a water fraction meter, such as the meter 32, for various actual water cuts, that is, the ratio of water flow rate to total liquid flow rate. The three curves of FIG. 6 are, as indicated, for three different actual water cuts (WC) of 0.90, 0.50 and 0.18. The corrected water fraction and the corrected gas fraction are determined by measuring the water fraction with the water fraction meter 32, calculating an approximate water cut (WC) with equation (14) and a calculated gas fraction value in equation (14) as determined from equation (13) and entering the diagram of FIG. 6 with the calculated values of gas fraction and water cut (WC). Interpolation between the curves for values of WC may be necessary, of course. One or two iterations of this process should provide sufficiently accurate values for fw* and fg*.

Figure 4:
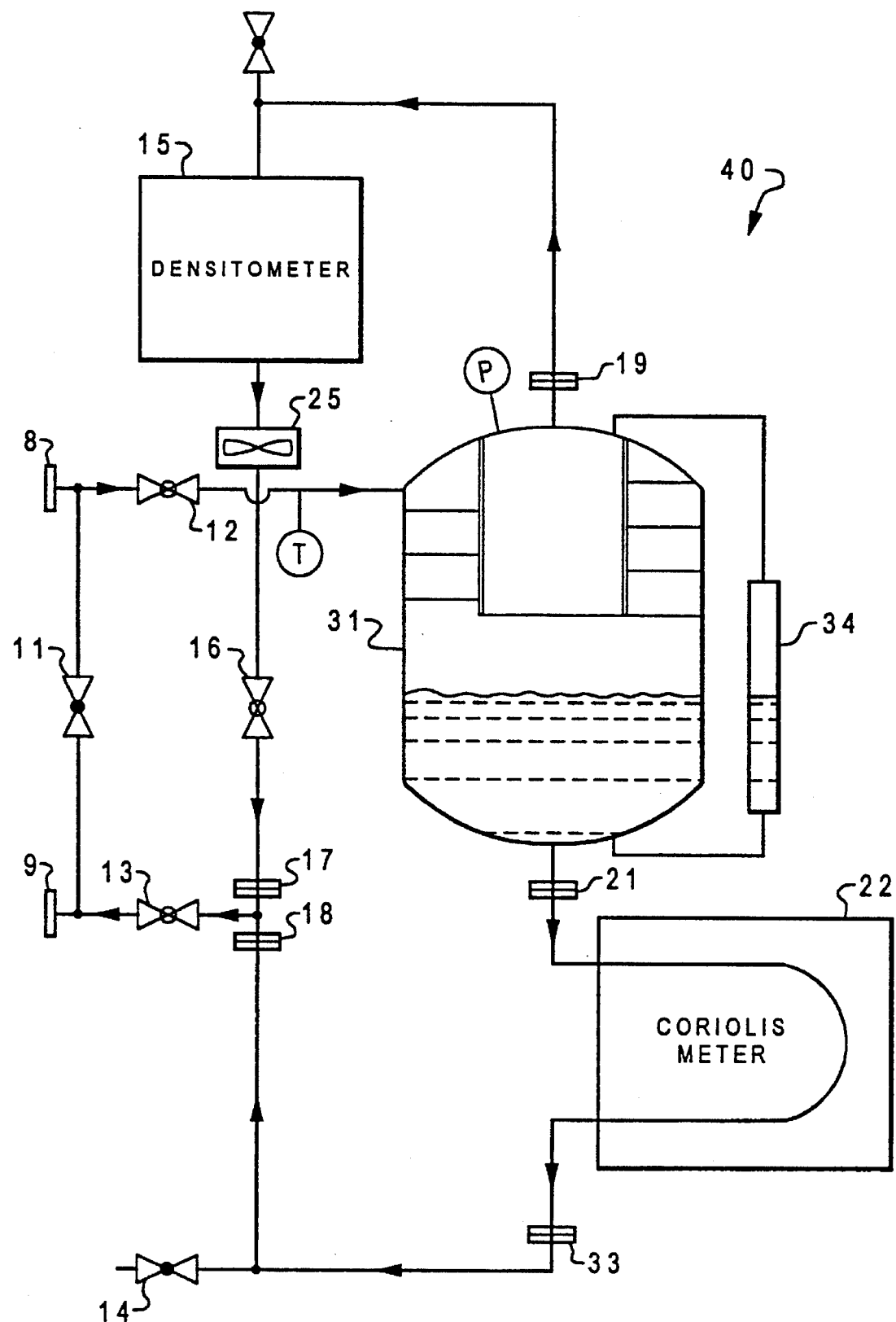
FIG. 4 is a schematic diagram of a third alternate embodiment of a flowmeter in accordance with the invention and similar to the system of FIG. 2 but which is capable of measuring fluid mixtures with a relatively high percentage of gas in the total flow but with relatively low foaminess of the liquid component of the mixture.

Referring now to FIG. 4, there is illustrated yet another embodiment of a multiphase flowmeter system in accordance with the invention and generally designated by the numeral 40. The flowmeter 40 is capable of measuring a multiphase fluid flowstream wherein a relatively high gas-to-liquid ratio exists but where the foaminess of the liquid is relatively low, that is the gas volumetric content in the liquid, after separation, is less than about 5%. The flowmeter 40 includes a separator 31 with a manually adjustable level control valve 16 and a liquid level sight glass or device 34. The gas separated from liquid in the separator 31 flows through a gas "leg" or flowpath which includes a densitometer 15 and a flowmeter 25, is recombined with the liquid flowstream between the flanges 17 and 18 and flows through the isolation valve 13 to the production flowline connected to the flange 9. The liquid "leg" or flowline is connected to a Coriolis meter 22 which measures the liquid density and the liquid mass flow rate. Gas density is measured by the densitometer 15 and gas volumetric flow rate is measured by the flowmeter 25.

In use of the flowmeter 40, it is assumed that the oil density, water density, gas specific gravity, gas compressibility factor and water fraction (approximate) are known and that the process pressure and temperature may either be known or measured as indicated by the pressure and temperature sensors shown in the diagram. The data acquired from the densitometer 15, measured gas density (dgm), the flowmeter 25, measured gas volume flow rate (Qgm), and the Coriolis meter 22, (Mc, dc), together with pressure and temperature, if measured, are input to a suitable data acquisition system wherein the following calculations are made to determine the respective parameters indicated. As will be indicated from the following sets of equations, the oil flow rate, the water flow rate and the gas flow rate may be determined in both the gas "leg" and the liquid "leg", assuming some carry-over of liquid into the gas leg and some carry-over of gas into the liquid leg, based on the measurements made in respect to the liquid flow through the meter 40 and the gas flow through the meter 40, respectively.

liquid leg flow $$dg = \text{gas density} \quad (20)$$
$$= (29 \cdot Gg \cdot P)/(10.73 \cdot z \cdot (460 + T))$$

$$dl = \text{liquid (oil + water) density} \quad (21)$$
$$= do(1 - WC) + dw(WC)$$

$$Qc = \text{gassy liquid flow rate; from Coriolis meter; } BPD \quad (22)$$
$$= Mc/dc$$

$$Q_L = \text{liquid flow rate; } BPD \quad (23)$$
$$= Qc(dc - dg)/(dl - dg)$$

$$Qlo = \text{oil flow rate; } BPD \quad (23a)$$
$$= (1 - WC)Q_{ll}$$

$$Qlw = \text{water flow rate; } BPD \quad (24)$$
$$= WC \cdot Q_{11}$$

$$Qlg = \text{gas flow rate; cubic feet/day} \quad (25)$$
$$= (Qc - Qlo - Qlw)(5.615)$$

and for the gas leg $$fgg = \text{gas fraction} \quad (26)$$
$$= (dl - dgm)/(dl - dg)$$

$$Qgo = \text{oil flow rate; } BPD \quad (27)$$
$$= Qgm(1 - fgg)(1 - WC)$$

$$Qgw = \text{water flow rate; } BPD \quad (28)$$
$$= Qgm(1 - fgg)(WC)$$

$$Qgg = \text{gas flow rate; cubic feet/day} \quad (29)$$
$$= Qgm(fgg)(5.615)$$

Thus the combined flows become $$Qo = \text{total oil flow; } BPD \quad (30)$$
$$= Qlo + Qgo = \text{sum of equations (23) and (27)}$$

$$Qw = \text{total water flow; } BPD \quad (31)$$
$$= Qlw + Qgw = \text{sum of equations (24) and (28)}$$

$$Qg = \text{total gas flow; cubic feet/day} \quad (32)$$
$$= Qlg + Qgg = \text{sum of equations (25) and (29)}$$

wherein dc=the liquid density measured by the Coriolis meter 22 in pounds per barrel, Mc is the liquid mass flow rate in pounds per day measured by the Coriolis meter 22, dgm is the gas density in pounds per cubic foot measured by the densitometer 15, and Qgm is the volumetric flow rate in barrels per day measured by the flowmeter 25.

Figure 5:
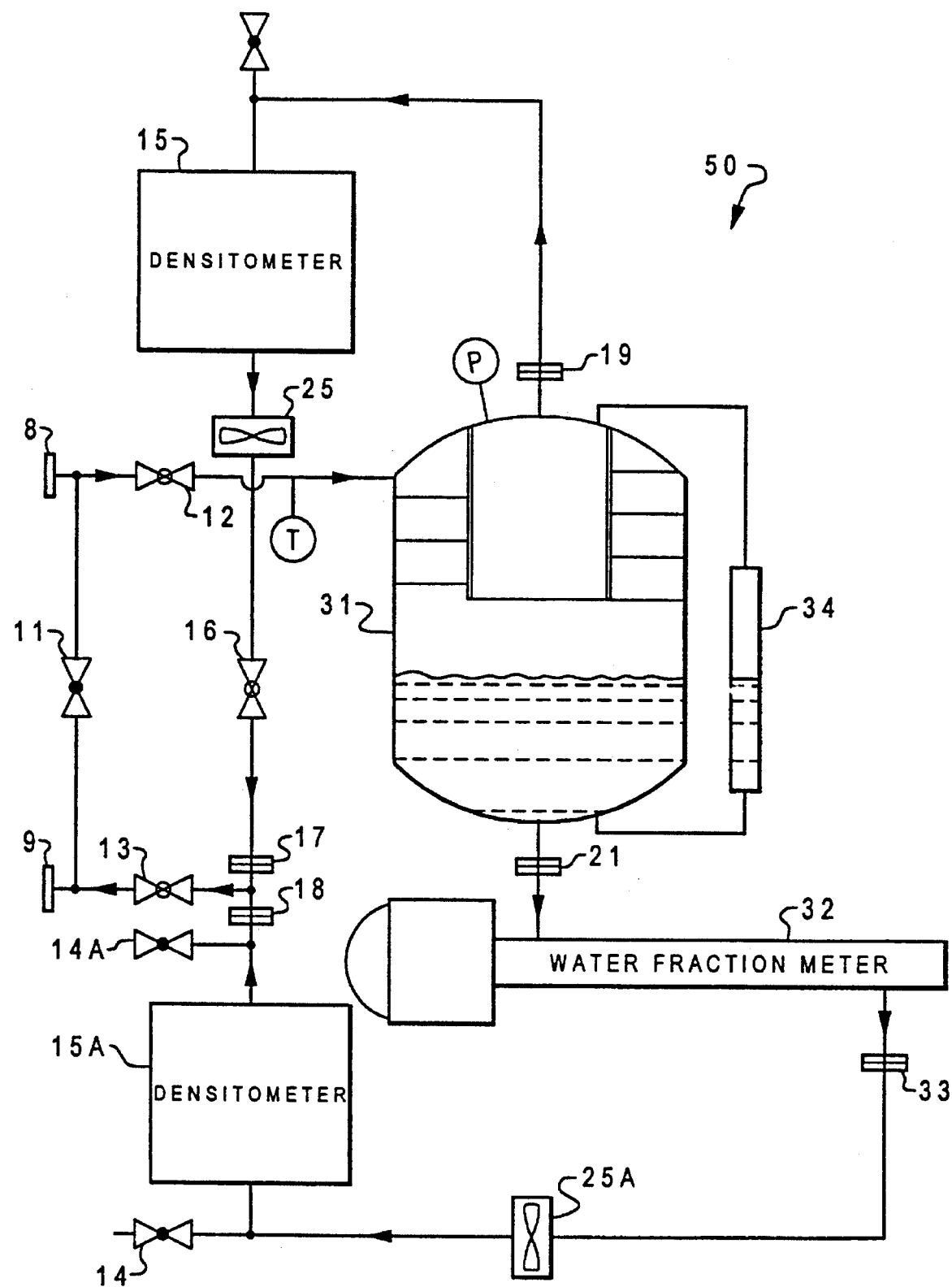
FIG. 5 is a schematic diagram of a fourth alternate embodiment of a multiphase fluid flowmeter for handling fluid mixtures of relatively high gas content, liquid foaminess and wherein greater accuracy is required than with the system of FIG. 4.

Referring now to FIG. 5, there is illustrated a schematic diagram of a flowmeter 50 which includes the separator 31, and a liquid flow circuit which includes a water fraction meter 32, a flowmeter 25A, and a densitometer 15A. The gas and liquid flows separated by the separator 31 are recombined at the flanges 17 and 18 for flow through the isolation valve 13 back to the production flowline connected to the flange 9. Gas separated in the separator 31 flows through a densitometer 15 and a flowmeter 25 before being recombined with the liquid flow. The flowmeter 50 is capable of handling relatively high gas-to-liquid ratios and also where the liquid foaminess is relatively high, that is the gas carryover into the conduit leading to the water fraction meter 32 may be up to about twenty percent by volume. The flowmeter 50 is considered to be more accurate than the flowmeter 40 because of the inclusion of the water fraction meter 32 so that the water fraction will not have to be inferred from density measurements. The only assumptions required for the flowmeter 50 are the oil, water and gas densities (which may be separately measured), the gas compressibility factor and, optionally, the process pressure and temperature. However, these last two mentioned parameters may be continuously measured and the data input to a data acquisition and calculation system, aforementioned, along with the measurements made by the densitometers 15 and 15A, the flowmeters 25 and 25A, and the water fraction meter 32.

Calculations of flow through the liquid flow circuit or "leg" of the flowmeter 50, including the water fraction meter 32, the flowmeter 25A and the densitometer 15A are carried out using the set of equations which are same as for the flowmeter 30. Oil density, do, water density, dw, and the gas specific gravity, Gg, as well as gas compressibility factor, z, are predetermined. Accordingly, the gas density, gas fraction and water fraction are calculated and corrected in accordance with the method set forth above for the flowmeter 30 which provides for calculation of the oil flow rate, water flow rate and gas flow rate through that portion of the circuit of the flowmeter 50 which includes a water fraction meter, a flowmeter and a densitometer. Equations (35) through (41) below use the designation "g" for quantities measured through the gas "leg" and "l" for quantities measured through the liquid "leg".

Calculations of gas density, liquid density and gas fraction of the fluid flowing from the separator 31 through the densitometer 15 and the flowmeter 25 of the gas flow circuit or "leg" of the flowmeter 50 are determined from the following equations.

$$dg = \text{gas density} \quad (33)$$
$$= (29 \cdot Gg \cdot P)/(10.73 \cdot z \cdot (460 + T))$$

$$dl = \text{liquid (oil + water) density} \quad (34)$$
$$= do + (dw - do)(fw^*/(1 - fg^*))$$

$$fgg = \text{gas leg gas fraction; first approximation} \quad (35)$$
$$= (dl - dgm)/(dl - dg)$$

and the oil flow rates, water flow rates and gas flow rates through that portion of the system are determined from the following equations:

| $Qgo$ | = | oil flow rate; BPD | (36) |
| --- | --- | --- | --- |
|  | = | $Qgm(1-fgg-fw*)$ |  |
| $Qgw$ | = | water flow rate; BPD | (37) |
|  | = | $Qgm(fw*)$ |  |
| $Qgg$ | = | gas flow rate; cubic feet/day | (38) |
|  | = | $Qgm(fgg)(5.615)$ |  | and the combined flows become:

| $Qo$ | = | total oil flow; BPD | (39) |
| --- | --- | --- | --- |
|  | = | $Qlo + Qgo$ = sum of equations (17) and (36) |  |
| $Qw$ | = | total water flow; BPD | (40) |
|  | = | $Qlw + Qgw$ = sum of equations (18) and (37) |  |
| $Qg$ | = | total gas flow; cubic feet/day | (41) |
|  | = | $Qlg + Qgg$ = sum of equations (19) and (38) |  |

Several embodiments of an improved flowmeter for measuring multiphase fluid flow, primarily gas, water and oil, have been described in detail herein, those skilled in the art will recognize that various substitutions and modifications may be made to the embodiments described without departing from the scope and spirit of the invention as set forth in the appended claims.

What is claimed is:

1. A method for determining the gas density, liquid density, and the volumetric flow rates of a multiphase fluid and each of the components of said multiphase fluid comprising a gas and a liquid mixture of oil and water without separating gas from said multiphase fluid, wherein the densities of the oil and water are known, the specific gravity of the gas is known, the pressure and temperature of said multiphase fluid flowstream are either assumed or measured, and the fraction of one liquid in the liquid mixture is known, comprising the steps of:

measuring the density of the multiphase fluid, and the volumetric flow rate of the multiphase fluid, determining the gas density based on said assumed or measured pressure and temperature of the multiphase fluid flowstream and the gas specific gravity, determining the density of the liquid mixture from the assumed densities of each of the oil and water in the liquid mixture and the fraction of one liquid in the liquid mixture, and determining the liquid mixture volumetric flow rate based on said volumetric flow rate of said multiphase fluid, the density of said multiphase fluid and the values of gas density and liquid mixture density.

2. The method set forth in claim 1 including the step of:

determining the water flow rate of said multiphase fluid based on the liquid mixture volumetric flow rate and the fraction of one liquid in the liquid mixture.

3. The method set forth in claim 2 including the step of:

determining the oil flow rate of said multiphase fluid based on said liquid mixture volumertric flow rate and said fraction of one liquid in said liquid mixture.

4. The method set forth in claim 3, including the step of:

determining the gas flow rate based on said flow rate of said multiphase fluid, the oil flow rate and the water flow rate.

5. A method for determining the gas density, liquid density, and the flow rates of a multiphase fluid and each of the components of said multiphase fluid comprising gas and a liquid mixture of oil and water, wherein the densities of the oil and water are known, the pressure and temperature of said multiphase fluid flowstream are either assumed or measured, and the specific gravity of the gas is known, comprising the steps of:

measuring the density of the multiphase fluid, the volumetric flow rate of the multiphase fluid, and the fraction of one liquid in the liquid mixture;

determining the gas density based on said assumed or measured pressure and temperature of the multiphase fluid and the gas specific gravity;

calculating the gas volumetric fraction of the multiphase fluid based on the density of the oil, the density of the water, the density of the gas, the density of the multiphase fluid, and the measured fraction of one liquid in the liquid mixture;

determining the fraction of one liquid in the liquid mixture as a first approximation based on the measured fraction of one liquid in the liquid mixture and the calculated gas fraction; and determining a corrected fraction of said one liquid in the liquid mixture based on the measured fraction of said one liquid and said first approximation.

6. The method set forth in claim 6 including the step of:

determining a corrected gas fraction of the gas in the multiphase fluid based on the density of the oil, the density of the water, the density of the gas, the density of the multiphase fluid, and the corrected liquid fraction.

7. The method set forth in claim 6 including the step of:

determining the volumetric flow rate of oil based on the volumetric flow rate of the multiphase fluid, the corrected gas fraction, and the corrected liquid fraction.

8. The method set forth in claim 6 including the step of:

determining the volumetric flow rate of liquid based on the volumetric flow rate of the multiphase fluid and the corrected water fraction.

9. The method set forth in claim 6 including the step of:

determining the volumetric flow rate of gas based on the volumetric flow rate of the multiphase fluid and the corrected gas fraction.

10. A flowmeter for determining the flow rate of each of the fluid components of gas, oil and water in a multiphase fluid comprising a mixture of said gas, oil and water, comprising:

a separator for substantially separating gas and liquid from the multiphase fluid and gas conduit means for conducting a fluid flowstream comprising primarily gas from said separator;

a densitometer interposed in said gas conduit means for measuring the density of said fluid flowstream and a flowmeter in communication with said gas conduit means for measuring the volumetric flow rate of said fluid flowstream;

liquid conduit means for conducting liquid from said separator; and a Coriolis meter interposed in said liquid conduit means for measuring at least one of liquid stream density and liquid mass flow rate.

11. A method for determining the volumetric flow rate of a multiphase fluid comprising gas and a liquid mixture of oil and water wherein the oil density, water density, gas specific gravity, gas compressibility factor, and water fraction in the liquid mixture of oil and water are known, and the pressure and temperature of said multiphase fluid flowstream are either assumed or measured, using a multiphase fluid flowmeter including a liquid-gas separator having a liquid mixture discharge conduit and a conduit for conducting a fluid which is primarily gas from said separator, a Coriolis meter for measuring the density of the liquid mixture and the liquid mixture mass flow rate flowing from said separator, a densitometer for measuring the density of said fluid flowing from the separator and a volumetric flowmeter for measuring the volumetric flow rate of said fluid flowing from said separator, said method including the steps of:

determining the gas density based on the gas specific gravity, the gas compressibility factor, and said assumed or measured pressure and temperature of the multiphase fluid flowing through said multiphase fluid flowmeter;

determining the liquid mixture density, based on the density of oil, the density of water, and the water fraction;

measuring the mass flow rate and density of said liquid mixture flowing in said liquid mixture discharge conduit with said Coriolis meter;

determining the volumetric flow rate of the liquid mixture flowing through the Coriolis meter based on the ratio of the mass flow rate of the liquid mixture and the density of the liquid mixture measured by said Coriolis meter;

determining the flow rate of liquid in the liquid mixture based on said volumetric flow rate of said liquid mixture, the gas density, the measured liquid mixture density and the determined liquid mixture density; and determining the flow rate of oil in the liquid mixture based on said determined liquid flow rate and the water fraction.

12. The method set forth in claim 11 including the step of:

determining the flow rate of water in the liquid mixture based on said determined liquid flow rate, and the water fraction.

13. The method set forth in claim 12 including the step of:

determining the volumetric gas flow rate based on the liquid mixture volumetric flow rate, the oil flow rate and the water flow rate.

14. The method set forth in claim 13 including the step of:

determining the gas fraction based on the determined liquid mixture density, the density of the fluid flow measured by the densitometer and the gas density determined from the gas specific gravity, the gas compressibility factor, and said assumed or measured pressure and temperature of the multiphase fluid.

15. The method set forth in claim 14 including the step of:

determining the oil flow rate in the fluid flowing from said separator based on the fluid flow rate measured by the volumetric flowmeter, the gas fraction and the water fraction.

16. The method set forth in claim 14 including the step of:

determining the water flow rate in the fluid flowing from said separator based on the fluid flow rate measured by the volumetric flowmeter, the gas fraction and the water fraction.

17. The method set forth in claim 14 including the step of:

determining the gas flow rate based on the fluid flow rate measured by the volumetric flowmeter and the gas fraction.

18. A flowmeter for determining the flow rate of each of fluid components of gas, oil and water in a multiphase fluid flowstream comprising a mixture of said gas, oil and water, comprising:

a separator for receiving said multiphase fluid flowstream and for separating fluid from liquid, gas conduit means for conducting fluid from said separator and liquid conduit means for conducting liquid from said separator;

a densitometer and a flowmeter interposed in said gas conduit means for measuring the density of a fluid flowstream comprising primarily gas and the volumetric flow rate of said fluid flowstream, respectively; and a water fraction meter, a flowmeter and a densitometer, interposed in said liquid conduit means for measuring the water fraction, the volumetric flow rate, and the density of the liquid separated from fluid in said separator, respectively.

19. A method for determining the volumetric flow rates of oil, water and gas in a multiphase fluid flowstream wherein the oil density, water density, gas specific gravity, gas compressibility factor are known, and the pressure and temperature of the multiphase fluid flowstream are either assumed or measured, comprising the steps of:

providing a multiphase fluid flowmeter including a gas-liquid separator, a densitometer and a volumetric flowmeter interposed in a gas conduit for conducting a fluid which is primarily gas from said separator and a water fraction meter, densitometer and volumetric flowmeter interposed in a liquid conduit for conducting fluid which is primarily liquid from said separator;

separating gas from liquid, flowing fluid comprising primarily gas through said gas conduit and flowing fluid comprising primarily liquid through said liquid conduit;

measuring the density of the fluid flowing through said gas conduit;

measuring the density of the fluid flowing through said liquid conduit;

measuring the fluid volumetric flow rate through said gas conduit;

measuring the fluid volumetric flow rate through said liquid conduit;

measuring the water fraction of the fluid flowing through said liquid conduit;

determining the density of the gas in said multiphase fluid based on the gas specific gravity, the gas compressibility factor, and said assumed or measured pressure and temperature of the multiphase fluid flowstream;

calculating the gas volumetric fraction of the multiphase fluid based on the oil density, the water density, the gas density, the density of the multiphase fluid, and the measured fraction of water in the liquid mixture;

determining the water fraction in the liquid mixture as a first approximation based on the measured water fraction in the liquid mixture and the calculated gas fraction;

determining a corrected water fraction in the liquid mixture based on the measured water fraction and said first approximation;

determining a corrected volumetric gas fraction based on the density of the oil, the oil density, the water density, the gas density, the density of the multiphase fluid, and the corrected water fraction;

determining the density of the liquid flowing through said gas conduit based on the oil density, the water density, the corrected water fraction and the corrected gas volumetric fraction; and determining the gas fraction of the fluid flowing through said gas conduit based on the determined values of gas density, liquid density and measured fluid density from the densitometer in said gas conduit.

20. The method set forth in claim 19 including the step of:

determining the oil flow rate in said gas conduit based on the fluid flow rate measured by the volumetric flowmeter, the determined value of the gas fraction in said gas conduit and the corrected water fraction.

21. The method set forth in claim 19 including the step of: determining the water flow rate in said gas conduit from the fluid flow rate measured in said gas conduit and the corrected water fraction.

22. The method set forth in claim 19 including the step of:

determining the gas flow rate in said gas conduit based on the fluid flow rate in said gas conduit and the gas fraction.

* * * * *